(12) United States Patent
Wang et al.

(10) Patent No.: US 9,550,323 B2
(45) Date of Patent: Jan. 24, 2017

(54) SYSTEMS AND METHODS FOR ADAPTIVE PROCESS CONTROL USING A TARGET KINEMATICS PROFILE IN WELDING TOGETHER MULTIPLE POLYMERIC WORKPIECES

(71) Applicants: Pei-Chung Wang, Troy, MI (US); Jeffrey A Abell, Rochester Hills, MI (US); John Patrick Spicer, Plymouth, MI (US)

(72) Inventors: Pei-Chung Wang, Troy, MI (US); Jeffrey A Abell, Rochester Hills, MI (US); John Patrick Spicer, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 157 days.

(21) Appl. No.: 14/476,310

(22) Filed: Sep. 3, 2014

(65) Prior Publication Data

US 2015/0068660 A1 Mar. 12, 2015

Related U.S. Application Data

(60) Provisional application No. 61/874,386, filed on Sep. 6, 2013.

(51) Int. Cl.
*B29C 65/08* (2006.01)
*B29C 65/00* (2006.01)
(Continued)

(52) U.S. Cl.
CPC .............. *B29C 66/90* (2013.01); *B29C 65/08* (2013.01); *B29C 66/1122* (2013.01);
(Continued)

(58) Field of Classification Search
CPC ............ B29C 65/088; B29C 66/73921; B29C 66/83221; B29C 66/9221; B29C 66/92443; B29C 66/9261; B29C 66/92921; B29K 2101/12
(Continued)

(56) References Cited

U.S. PATENT DOCUMENTS

2007/0244595 A1* 10/2007 Statnikov .................. B24B 1/04
700/160
2009/0188966 A1* 7/2009 Klinstein ................ B29C 65/08
228/102

(Continued)

*Primary Examiner* — George Koch
(74) *Attorney, Agent, or Firm* — Mickki D. Murray, Esq.; Parks IP Law LLC (57) ABSTRACT

An ultrasonic welding system, for welding together two workpieces wherein at least one of the workpieces includes a polymeric composite, comprising an energy applicator positioned along an action axis so that, in operation, ultrasonic vibrations transmitted from the energy applicator during a welding routine, are transmitted to the workpieces generally at and/or adjacent the axis. The system also includes a primary, course-control, actuator positioned along action axis so that a first load, output by the primary actuator, acts along the system action axis. The system further comprises a secondary, fine-control, actuator positioned along the system action axis so that a second load output, by the secondary actuator, acts along the axis. And the system comprises a controller for providing first command signals and second command signals to the primary actuator and second actuator to control them to effect loads on the workpieces, during the welding routine and along the axis.

20 Claims, 5 Drawing Sheets

(51) Int. Cl.
*B29K 101/12* (2006.01)
*B29K 105/00* (2006.01)

(52) U.S. Cl.
CPC ............ *B29C 66/43* (2013.01); *B29C 66/721* (2013.01); *B29C 66/8246* (2013.01); *B29C 66/83221* (2013.01); *B29C 66/9261* (2013.01); *B29C 66/92443* (2013.01); *B29C 66/92921* (2013.01); *B29C 66/9672* (2013.01); *B29C 66/9674* (2013.01); *B29C 66/7212* (2013.01); *B29C 66/7392* (2013.01); *B29C 66/73921* (2013.01); *B29C 66/742* (2013.01); *B29C 66/8242* (2013.01); *B29C 66/9221* (2013.01); *B29C 66/961* (2013.01); *B29K 2101/12* (2013.01); *B29K 2105/253* (2013.01)

(58) Field of Classification Search
USPC .............. 156/64, 73.1, 73.5, 73.6, 350, 367, 368,156/580.1
See application file for complete search history.

(56) References Cited

U.S. PATENT DOCUMENTS

2012/0118476 A1* 5/2012 Weiler .................... B29C 65/08
156/64
2012/0180929 A1* 7/2012 Koetting ................ B23K 20/10
156/64

\* cited by examiner

Fig. 3

SYSTEMS AND METHODS FOR ADAPTIVE PROCESS CONTROL USING A TARGET KINEMATICS PROFILE IN WELDING TOGETHER MULTIPLE POLYMERIC WORKPIECES

TECHNICAL FIELD

The present disclosure relates generally to an improved technique for welding together multiple workpieces and, more particularly, to systems and methods for improved ultrasonic welding of polymeric composites using adaptive process control to match ultrasonic-horn kinematics to pre-established target horn-kinematics, e.g., to a target horn displacement, velocity, or acceleration profile.

BACKGROUND

In automotive manufacturing, polymeric composites are being used increasingly due to their favorable characteristics, such as being lightweight, highly-conformable or shapeable, strong, and durable. Some composites are further colorable and can be finished to have most any desired texture.

The increased use in automobiles includes, for instance, in instrument and door panels, lamps, air ducts, steering wheels, upholstery, truck beds or other vehicle storage compartments, upholstery, external parts, and even engine components. Regarding engine components, and other under-the-hood (or, UTH) applications, for instance, polymers are configured, and are being developed continuously, that can withstand a hot and/or chemically aggressive environment. Regarding external parts, such as fenders, polymers are being developed that have high heat, environmental, and chemical resistance over longer periods of time. And many other potential usages in automotive applications are being considered continuously.

With the increased use of polymers, polymer composites, and other low-mass materials, compression molding and post-mold joining techniques—e.g., ultrasonic welding—are also being used more commonly.

Some conventional ultrasonic welding techniques are open-loop controlled. Upon positioning of an ultrasonic energy applicator—e.g., ultrasonic tip, referred to as a sonotrode or horn—at a point of welding, the applicator is controlled, according to an open-loop program, to descend onto the part, transmit ultrasonic vibrations following contact, and continued to descend while transmitting the vibrations. Applicator kinematics, e.g., motion, is thus controlled in the same manner, according to the program, in each iteration of welding.

For some techniques, welding systems employ a sort of closed-loop feedback control to ensure that the horn vibration is maintained at a certain, constant resonance frequency—e.g., 20 kHz.

Due to variations in welding conditions, with parameters for each iteration being kept constant (i.e., constant horn vibration frequency, amplitude of vibration, and downward force on the workpiece), the same welding function does not yield the same results in each instance. Variations include, primarily, those related to the workpieces being welded together—e.g., workpiece material, workpiece size and shape, workpiece surface roughness, workpiece surface cleanliness, and workpiece positioning and securing (e.g., clamping). Environmental conditions, and condition, including cleanliness, of the energy applicator can also be factors.

Regarding component material, one or both workpieces may contain unintended contaminants. Or workpieces can include more or less basic material than desired, such as more or less carbon-fiber than specified. The contaminants, or surplus/deficiency in make-up materials, affect workpiece reaction to welding energy. The workpieces may melt slower, or more quickly, than usual, for instance.

Also regarding workpiece material, one or both workpieces might contain defects, such as unwanted porosity. Or there might be local differences in mechanical properties of workpiece material, such as due to changes in volume fraction or orientation of fibers (e.g., carbon fibers or glass fibers) in the case of fibrous composites—a fiber-reinforced polymer (FRP) composite.

Regarding workpiece size and shape, it has been found, for example, that a relatively-slight change in volume (e.g., 2%), or difference in a local thickness or contouring, can have a relatively large affect on material melting properties.

Regarding workpiece positioning and clamping, one or both workpieces sometimes becomes malpositioned originally or due to improper clamping. Even a slight malpositioning can affect welding. Less than optimal contact between the weld energy applicator (e.g., horn) and a proximate workpiece, for instance, can lower welding effectiveness significantly in a conventional open-loop system.

Surface-related characteristics—e.g., cleanliness, roughness (rougher or smoother than specified (e.g., in a specification)), and coatings (e.g., too little or too much of a coating)—also affect the efficiency with which the ultrasonic vibrations are transferred to and through the workpieces.

Because conventional, open-loop, techniques do not accommodate variations affecting the weld process—such as contaminants in the workpiece or an unclean workpiece surface, overwelding and underwelding is common in use of those techniques.

Overwelded parts may be undesirable cosmetically, for example. Over welded joints may be weaker, e.g., due to excessive heating/melting of the material, resulting in weaker mechanical properties in and around the joint.

And overwelding may require more energy and time than desired. In a contemplated scenario, for instance, in which a welding horn is lowered until the horn lowers to a pre-set depth of the workpiece, more energy and time will be expended if the workpieces are melting slower than expected.

Underwelded parts, of course, produce weaker joints due to an undesirably low amount of bonding between the workpieces.

Underwelded and overwelded parts may need to be repaired, recycled, or scrapped.

The present technology addresses these and other shortcomings of prior welding techniques.

SUMMARY

The present technology relates to systems and methods for welding together multiple workpieces.

More particularly, the technology provides improved systems, algorithms, and methods for welding polymeric composites using adaptive process control.

The control, in one embodiment, involves controlling an ultrasonic horn so that its kinematics (e.g., displacement, position, velocity, or acceleration) match a pre-established target horn kinematics profile or signature.

Other aspects of the present invention will be in part apparent and in part pointed out below.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the example foci, below (e.g., claims) and as a representative basis for teaching one skilled in the art to variously employ the present disclosure.

While the description includes a general context of computer-executable instructions, the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like.

Reference to directions herein, such as upper, lower, up, down, and lateral, are provided to facilitate description of the present technology but does not limit scope of the technology. A description in which an ultrasonic horn is described as descending down upon a proximate workpiece is not limited, for example, to the horn moving vertically downward in the earth, or environment, frame. The horn in this case can be moving from left to right, for example, in the environment frame.

I. General Overview of the Disclosure

The present disclosure describes a dynamic ultrasonic welding technique for joining workpieces such as polymeric composites. The technique involves controlling a welding operation adaptively to ensure desired welding and resulting welds.

A welding system is controlled by a closed-loop process. Generally, a controller controls variables of the welding operation based on an algorithm and real-time feedback from sensors monitoring the welding system during welding.

In one embodiment, the algorithm includes a target energy-applicator-motion profile for controlling the weld-energy applicator—e.g., sonotrode or horn—over time. The profile can be referred to also as a target horn-motion profile, a target horn-movement profile, a target motion signature, a target movement signature, the like or similar.

The profile may be represented as a displacement-versus-time profile, or signature, having target displacement values for the applicator corresponding to points in time of the welding operation. The target values are, in one embodiment, pre-determined, such as in laboratory testing.

In one embodiment, it is a preferred, main-line approach to, for instance, set the kinematic profile as a target displacement profile being a function of time. For example, the profile can be set to produce a certain amount of displacement at a certain point in time, or certain displacements at various corresponding times of the welding process.

In yet another embodiment, the kinematic profile is set to accomplish one or more pre-set velocities for the horn during the welding process.

In another embodiment, the kinematic profile is set to accomplish one or more pre-set accelerations for the horn during the welding process.

While use of relationships between one or more kinematic characteristics and time during the welding process are described primarily herein, in some embodiments, a relationship instead between the one or more kinematic characteristics and another factor is used. For instance, in some embodiments, the kinematic profile includes pre-set kinematic targets (e.g., displacement, position, velocity, or acceleration) as a function of cumulative power (i.e., energy) input into the workpiece arrangement in the welding process. As an example, in one implementation, the kinematic profile is set to accomplish a certain amount of displacement corresponding to output of a certain amount of energy, via the horn, into the workpiece arrangement.

The present technology includes a welding system and control apparatus, which can be a part of the system and in any event is configured to control the system.

The control apparatus is programmed with code to control energy-applicator movement, such as to move according to data points of the target movement profile or signature mentioned above.

The system components, algorithm, and operations are described further below with reference to FIGS. 1-3.

II. System Tooling and Workpieces

The present technology is now described with reference to example systems, tooling, and workpieces. The figures are referenced to facilitate understanding of the technology, and not to limit scope thereof.

II.A. General Welding System—FIG. 1

Figure 1:
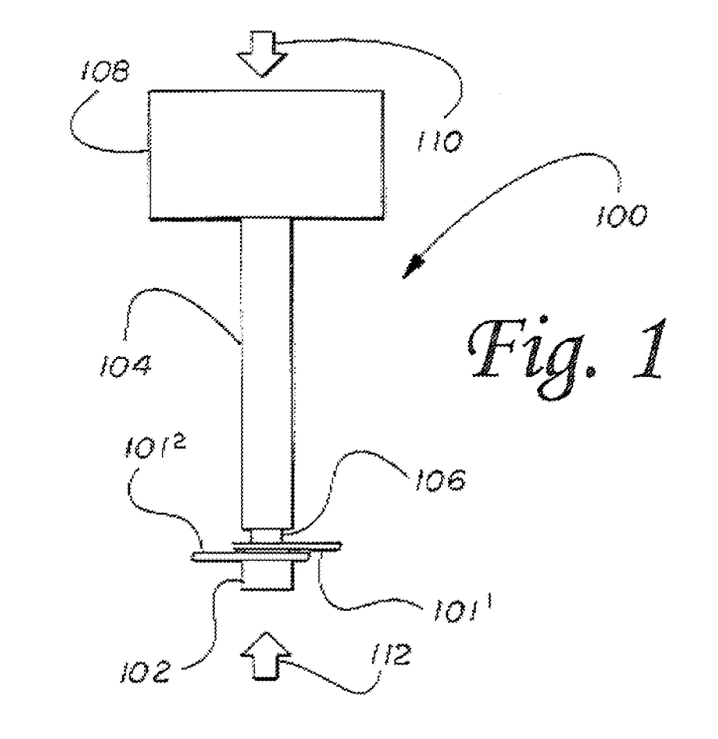
FIG. 1 illustrates a two-sided ultrasound system without feedback elements shown.

Now turning to the figures, and more particularly, the first figure, FIG. 1 shows an example welding system, indicated generally by reference numeral 100. The system 100 is used to weld together two workpieces $101^1$, $101^2$.

The system 100 includes a supporting, or under, structure 102, such as an anvil. The system also includes a welding arm 104 terminating in a welding energy application tip, or horn 106. In some embodiments, the arm 104 is considered a part of the structure 102.

In operation, the workpieces $101^1$, $101^2$ are sandwiched between the energy applicator 106 and the under-support (our opposite, opposing, or opposite-side support) structure—e.g., anvil 102.

The energy applicator (e.g., horn) 106 can include, for instance, an ultrasonic horn, configured to applying energy, in the form of high-frequency vibrations, to the workpieces for welding them together.

The actuator 108 may include various common features (not called out in detail in FIG. 1), such as a generator, a convertor, a booster, and a movable piston configured to connect, directly or indirectly, to the welding arm 104 for pushing the arm downward (i.e., in the direction indicated by force arrow 110 in FIG. 1).

In conventional systems, the actuator 108 operates in an open-loop manner, actuating the system according to a preset arrangement—e.g., at constant force for about 1 second, or at a ramped up and ramped down force over the time period. In some conventional embodiments, the actuator is controlled manually, such as turned on and off by a technician operating the system 100.

In operation, an application-direction force 110 is applied by and/or at the actuator 108. The force 110 pushes the arm 104 and horn 106 toward the workpieces 101 being welded together. A countering force, indicated by lower arrow 112 in FIG. 1, pushes the supporting structure 102 toward the workpieces. With the application-direction force 110 pushing toward the workpieces $101^1$, $101^2$ from a first, application, direction, and the counter force 112 pushing toward the pieces $101^1$, $101^2$ from an opposite direction, the workpieces $101^1$, $101^2$ are kept at a compression.

II.B. System with Closed-Loop Feedback Elements—FIG. 2

Figure 2:
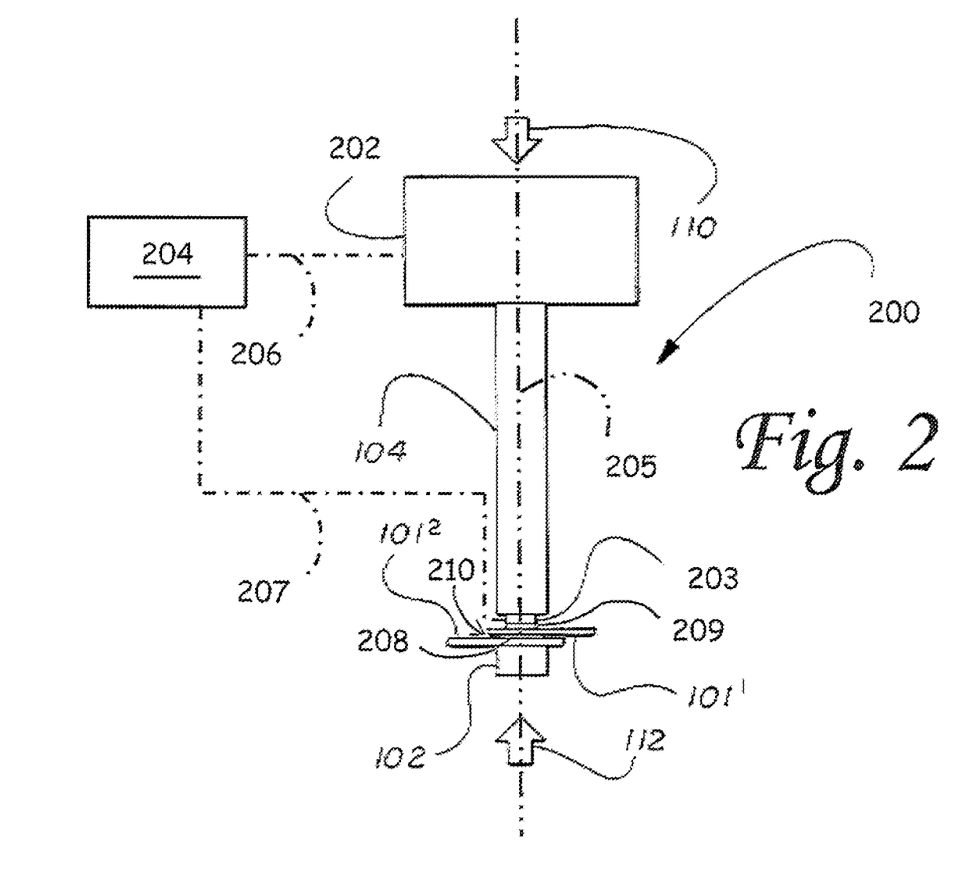
FIG. 2 illustrates the ultrasound system with closed-loop, feedback, components, according to an embodiment of the present technology.

FIG. 2 shows a welding system 200, like that of FIG. 1, modified at least with a closed loop arrangement according to the present technology. Features of the system 200 similar to or the same as features of the first system 100 are identified in FIG. 2 by the same reference numerals used in FIG. 1.

The system 200 includes a first, or primary, controllable actuator 202 and a second, or secondary, controllable actuator 203. One or both actuators 202, 203 are controlled by a controller 204, as described further below.

The actuators 202, 203 are positioned along a primary system action axis 205, or at least configured and arranged so that a resulting load or force generated by the actuator acts along the axis 205, as shown in FIG. 2. The system action axis 205 can be referred to by other names, such as an action line or axis, a force line or axis, an energy-application line or axis, or the like. The forces of each act downward along the system action axis 205, as indicated by top arrow 110. The countering force 112 acts upward and, also, along the system action axis 205.

The arm 104 and an energy applicator 209 (e.g., ultrasonic horn or sonotrode tip) are positioned along the system action axis 205, and portions of the workpieces 101 to be welded together are likewise positioned along the axis, for forming the weld there, as also shown in FIG. 2.

The first actuator 202 is configured to apply a generally larger, course, pressure, force, or load to the welding assembly, while the secondary actuator 203 is configured to apply smaller intermittent loads as needed for corrective measures. This first actuation results, e.g., from pneumatic pressure exerted on one or more pneumatic cylinders in the system 200.

In some embodiments, the primary controllable actuator 202 is controlled to provide a substantially constant force toward horn 106, and so to the workpieces 101. In some embodiments, the primary controllable actuator 202 is controlled to provide loads varying according to a pre-determined routine—i.e., to provide pre-designed dynamically-variable loads. An example pre-determined plan is a kinematic-related signature or profile, such as a profile indicating target positions, displacements, velocities, or accelerations for the weld energy applicator 209.

In some embodiments, the primary actuator 202 affects primary course motion and also provides secondary adaptive control movement. The primary actuator 202 of these embodiments could be, for instance, a servo drive. A designer or operation of the system can select or configure a servo actuator capable of responding with sufficient rapidness for adapting horn position and/or load on the workpiece—e.g., with a minimal time lag, such as within about 0.1 sec. The servo drive can also be selected or configured to have high position resolution/accuracy, such as within about 0.01 mm, and load resolution/accuracy, such as within about 10 Newtons. A servo having sufficient response and accuracy characteristics can be relied on, with need of a secondary actuator, for affecting the necessary profile (e.g., horn motion signature) during welding. The servo, on its own, as such, then affects both the primary course motion and the secondary adaptive control movement, as mentioned. In operation, the control algorithm receives feedback from, for instance, a motor encoder (e.g., position, velocity, and acceleration feedback) associated with the servo, and similar feedback from sources such as a linear position sensor (e.g., LVDT) and possibly a force transducer. The controller uses the information to adjust the welding operation (e.g., horn kinematics) for following the prescribed profile (e.g., motion signature).

Figure 4:
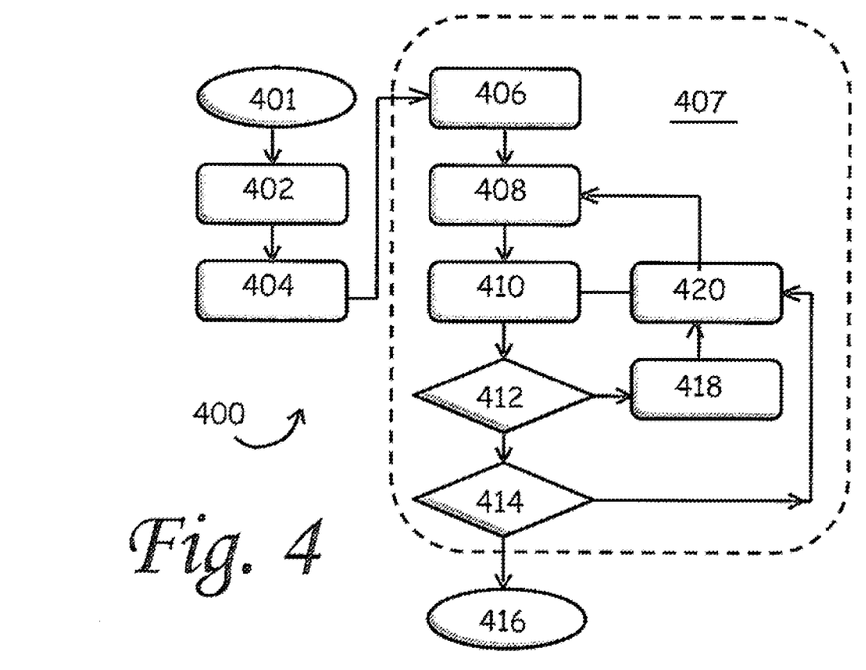
FIG. 4 illustrates an example method, performed using the algorithm described herein, for improved ultrasonic welding of polymeric composites using adaptive process control.

The profile 506 shown in FIG. 5 and described more below in connection with the method 400 of FIG. 4 shows an example kinematic profile, generally, and can be considered to show by the profile 506 target horn 209 positions, target displacement values for the horn 209, etc. As provided, in one embodiment, the kinematic profile (e.g., displacement, position, velocity, or acceleration profile) is a function of time, while, as noted above, in another it is a function of cumulative power (i.e., energy) input by the system 200 into the workpieces for effecting the welding.

For example, the profile can be set to produce a certain amount of displacement at a certain point in time, or certain displacements at various corresponding times of the welding process. In another embodiment, the profile could also be set to accomplish a certain amount of displacement in connection with output to the workpieces of a certain amount of energy via the horn.

The primary controllable actuator 202, in various embodiments, includes or is in operative communication with the controller 204. Similarly, in various embodiments, the secondary controllable actuator 203 includes or is also in operative communication with the controller 204.

The controller 204 may be connected to the primary controllable actuator 202 by a connection 206 to the secondary actuator 202 by a connection 207 to a secondary. The connections 206, 207 can include wired or wireless infrastructure.

For cases in which the components 202, 204 communicate wirelessly, the connection 206 includes appropriate wireless transmission features (e.g., transceivers, or at least appropriate transmitter and receivers; not shown in detail) in the respective components 202, 204.

So, in some embodiments, it is preferred that both actuators, 202, 203, be controlled by the controller 204. Alternatively, other devices/switches may be used to control one or both of the primary and secondary controllable actuators 202, 203.

The primary controllable actuator 202 in some embodiments includes a pneumatic actuator. While other types of primary actuators 202 can be used, such as a hydraulic actuator, or an electric servo actuator, pneumatic actuators are referred to often herein simply by way of example.

The primary actuator 202 may include any pressure reservoirs, pumps, valves, and/or control circuitry (elements not illustrated in detail) needed to effectuate the actuation upon receipt of the command signals via the communication path 206.

The secondary controllable actuator 203 (e.g., servo actuator) is an electrical-to-mechanical transducer, configured to convert electrical input command signals to a corresponding output displacement. Example transducers include servo and piezoelectric actuators. While other types of secondary controllable actuators 203 can be used, servos or piezos are referred to often herein, by way of example, as the secondary controllable actuator 203.

In one embodiment, an additional pneumatic control circuit (not shown in detail) is added to dynamically increase or decrease pressure on air cylinders of the system 200.

The secondary controllable actuator 203 (e.g., servo actuator) is configured to expand and contract in order to increase or decrease pressure between the energy applicator 209 (e.g., ultrasonic horn) and the under-support (e.g., anvil) 102—and so to increase or decrease the pressures therein, such as between the applicator 209 and the proximate workpieces 101, between the applicator and the distal workpiece 101², and between the workpieces 101¹, 101².

While the secondary controllable actuator 203 is shown positioned, along the system action axis 205, between the arm 104 and the energy applicator 209, the secondary actuator may be positioned elsewhere along the action axis 205, or otherwise, so long as the actuator 203 output is directed along the axis 205.

In a contemplated embodiment, the secondary actuator 203 is positioned, along the system action axis 205, between the workpieces 101 and the under-support (e.g., anvil) 102.

In one embodiment, in which the arm 104 is present and is not considered a part of the primary actuator 202, the secondary actuator 203 is positioned, along the system action axis 205, between the primary controllable actuator 202 and the arm 104.

In another, contemplated, embodiment, the primary controllable actuator 202 is movable and the secondary controllable actuator 203 is positioned, along the system action axis 205, above and in contact with the primary actuator 202 so as to move the primary actuator downward selectively.

In still another, contemplated, embodiment, the under-support 102 is movable and the secondary actuator 203 is positioned, along the system action axis 205, below and in contact with the support 102, so as to move the support upward selectively.

In yet another, contemplated, embodiment, the secondary actuator 203 is positioned, along the system action axis 205, within the primary actuator 202, and the secondary actuator 203 is configured and arranged to add pressure, or force, to the load already being provided by the primary actuator 202. Regarding this example, in particular embodiments, in which the arm 104 is considered a part of the primary actuator 202, the secondary actuator 203 would be considered within the primary actuator 202 if the secondary actuator 203 was positioned between an upper, force-generating, portion 202, shown in FIG. 2 and the lower, arm, and portion 104, shown in FIG. 2.

The controller 204 is configured to send various electrical signals to the secondary actuator 203 (e.g., servo actuator) so that motion of the energy applicator 209 (e.g., horn) during the welding routine matches corresponding data points of a pre-defined target kinematic profile or signature—e.g., a displacement or position profile or signature.

In one embodiment, a mechanical amplifier (not shown in detail) is positioned, along the system action axis 205, in series between the secondary actuator 203 and a component—e.g., the horn 209—that the secondary actuator 203 is arranged to push when actuating. In a contemplated embodiment, the amplifier is a part of the secondary actuator 203. If the secondary actuator 203 is positioned between the primary amplifier 202 and the arm 104, for instance, the mechanical amplifier is, then, positioned between the secondary actuator 203 and the arm 104.

As mentioned, the primary actuator 202 is in some embodiments configured to provide low-frequency, high-amplitude (or, more course) movement, while the secondary actuator 203 is, comparatively, configured to provide the force adjustment. The primary and secondary actuators, then, can be referred to by names such as course actuator, or course-control actuator, and fine actuator, or fine-control actuator, respectively.

In this configuration, the first actuator 202 may be used to move the welding tip 209 into contact with the proximate work piece 101¹, initially, for commencing welding, as described further below in connection with the process 400 of FIG. 4 (e.g., operations 402, 404), and to move the tip 209 during welding to create a baseline pressure load (e.g., a steady-state load or a load varying according to pre-set routine) on the workpieces 101.

And the secondary actuator is, then, used to counteract unwanted transient deviations from desired kinematic characteristics for the applicator 209—e.g., target horn displacement or horn position—wherein the deviations occur too quickly for the primary actuator 202 to compensate for. In this way, the primary actuator 202 is configured for effecting course translations of the welding tip 209 while the secondary actuator 203 is configured for effecting high-speed, dynamic adjustments.

The controller 204, as part of the closed-loop arrangement of the present technology, receives feedback from one or more other parts of the system 200 and prepares the control signals for controlling the actuator 202 according to programming of the controller 204.

As mentioned above and described below in more detail, the feedback in some embodiments includes data indicating actual, real-time kinematic characteristics—e.g., horn displacement or position—of the welding horn 209 during the welding routine.

In one embodiment, the feedback is received from the secondary actuator 203—e.g., servo, or piezoelectric actuator. The feedback can in this case be provided via the same connection 207 or a different connection.

In one embodiment, the feedback is received from a position or motion sensor, such as a linear variable differential transformer (LVDT), positioned appropriately.

As also mentioned above and described more below, programming of the controller in some embodiments includes target horn movement values as a function of time. The target values over time can be represented by a profile, or signature, which can be stored and/or represented by a profile, curve, or signature 506, as shown in the example chart 500 illustrated in FIG. 5.

The secondary actuator 203 and, more particularly, embodiments in which it 203 is includes a servo motor, are described further, here.

In operation of the system 200, control signals provided to the servo, via the communication link 206 described above, may include, e.g., radio signals, such as pulse width modulation (PWM) signals.

The servo includes various common parts that are not shown in detail. The servo would include, for instance, a relatively-small motor. The motor is electric, in some implementations, of an alternating current (AC) or a director current (DC) type. In a contemplated embodiment, the motor is a hydraulic motor.

The servo 203 can also include a lead screw connected to the motor, and a train of reduction gears arranged to be driven by the motor. The servo further includes, such as a linear output shaft, connector to the gears. In one implementation, motor rotation is translated to linear shaft movement.

The servo 203 can include closed-loop mechanisms allowing the servo to self correct. For instance, the servo can include a potentiometer or an encoder connected directly or indirectly to the output—e.g., linear output shaft. The potentiometer or encoder measures position of the output. The position measured is compared, e.g., in the servo 203, continually, in real time, to a commanded position indicated by a corresponding control signal received from the controller 204. Any difference represents an error between the commanded kinematic characteristics (e.g., target horn displacement, position, velocity, or acceleration) and the actual characteristic.

The servo 203 generates a corresponding error signal that adjusts motor operation to better match the incoming command signal(s)—e.g., driving the motor to produce more output in a same direction, less output in the same direction, or output in a different direction. When the output kinematic characteristic (e.g., position or displacement) matches the commanded kinematic characteristic, there is no difference—i.e., no error in the servo—and no servo operation/adjustment is needed, until a next command signal is received.

Various reasons may lead to the internal positioning error of the servo. Example reasons include receipt of an updated or new position command signal (e.g., from the controller 204), or the shaft being resisted by an unexpected or undesired encumbrance hindering desired and commanded output shaft movement, or the shaft being resisted less than expected.

Greater or lesser encumbrance, to output-shaft travel, than expected may result from any of a wide variety of circumstances. Example variables include, primarily, variations related to the workpieces being welded together—e.g., workpiece material, workpiece size and shape, workpiece surface roughness, workpiece surface cleanliness, and workpiece positioning.

In the present context of ultrasonic welding, the servo output shaft is connected to the ultrasonic horn 209. The horn 209 can be lowered gradually while the workpiece(s) beneath it melt in response to the high-frequency vibrations transmitted by the horn. If the melting occurs more slowly than expected, the horn, and so the contacting servo output shaft, are hindered, or hindered more than expected, from moving as desired—i.e., as commanded.

Example hindrances to melting, and so to desired servo output shaft movement, are slight variations in workpiece geometry—e.g., size and/or shape of the piece $101^1$.

Another example hindrance is an inter-workpiece tolerance (gap) being too large, such as due to improper clamping.

As still another example, a workpiece surface that has increased friction—e.g., is rougher, or is not as clean as expected or specified (e.g., in a specification)—can create sufficient hindrance to transmission of ultrasonic welding to affect—e.g., to hinder, or slow—horn travel. Still other example hindrances include undesired intra-workpiece particulates, or contaminants.

As yet another example hindrance to workpiece melting and, so, servo output shaft travel, the workpiece $101^1$ may include a base material other than a specified base material.

Another hindrance would be improper (e.g., insufficient) contact between the horn and proximate workpiece, which could result in insufficient heating.

As provided above, and in further detail below, some workpieces include a polymeric fiber composite. As yet another example of a possible hindrance to workpiece melting, and so to servo output shaft travel, is variances in the fiber composite. The variance can be, e.g., the workpiece $101^1$ having more or less fiber than specified and/or the fiber being distributed within the workpiece $101^1$ in an unexpected manner—e.g., fibers are distributed (e.g., fiber density) or oriented other than desired, as fiber orientations and fiber density might vary from workpiece to workpiece.

As mentioned, in some scenarios, the servo identified positioning error results from the servo output shaft facing less resistance than expected, and so travelling more than commanded. Example bases for less-than-expected resistance to servo output shaft travel can include, or be related to the bases provided above for greater-than-expected resistance.

In the context of ultrasonic welding, for instance, if the workpiece(s) melt more quickly than expected, the horn, and so the contacting servo output shaft, are hindered less than expected from moving toward the commanded kinematic characteristic (e.g., position or displacement). One example is, again, variations in workpiece geometry. As misshaping and sizing can increase resistance to melting and movement, depending on the geometry and welding arrangement (e.g., horn position vis-á-vis the misshaping), resistance might also be reduced below an expected level. In this case, the workpiece(s) melts more quickly than expected, causing the horn to travel more than expected—i.e., to travel beyond the commanded kinematic characteristic, resulting in an intra-servo positioning error determination.

As another example, a workpiece surface can have more or less friction, vis-á-vis the horn, than expected or specified (e.g., in a specification). This can increase or reduce resistance to melting, thereby increasing/decreasing horn 209 travel beyond/short of a corresponding commanded kinematic characteristic (e.g., position, displacement, velocity, or acceleration).

Conditions accelerating workpiece melting might also include undesired intra-workpiece particulates or undesired primary workpiece material. As yet another example of a possible accelerator to workpiece melting, and so to servo output shaft travel, is variances in fiber composite. The variance can be, e.g., the workpiece $101^1$ having more or less fiber than specified and/or the fiber being distributed (e.g., fiber density) within the workpiece $101^1$ in an unexpected or undesired manner, as fiber orientations and fiber density might vary from workpiece to workpiece as mentioned.

The secondary actuator 203 has beneficial characteristics including being able to apply relatively-large forces with a relatively-fast reaction time. The reaction time allows accurate and effective position control in quick-response situations such as ultrasonic welding processes.

Servo and piezoelectric actuators, for instance, are generally capable of producing high-force, highly precise actuation responses, at least only over short stroke lengths. Generally, piezo actuators operate over smaller stroke lengths, while servo actuators have greater stroke lengths.

Additionally, because the response time of servos and piezos is extremely fast, they are suitable to dynamically adjust the applied pressure load through the welding tip many times within an ultrasonic welding cycle. As an example of the fast reaction time, some piezos are capable of actuating at a frequency of at least 10 MHz.

Some servos can adjust as quickly as, e.g., every $1/60^{th}$ of a second. During a welding operation, or sub-process, that is, e.g., about one-second long or less, then, the servo can adjust about sixty times, allowing for many changes, or corrections, to servo output. Future actuators are expected to be even faster—e.g., centisecond ($1/100^{th}$ of a second) intervals or faster, and will be used.

In some cases, update speed of the pressure applied by the secondary actuator 203 may advantageously be greater than twice the ultrasonic vibration frequency.

In addition to servos and piezo electric actuators, or transducers, an additional pneumatic actuator or pneumatic control system could also be used to modify the position.

Generation of the control, or command, signals is described further below, in connection with the algorithm and method of FIG. 4.

II.C. Example Controller—FIG. 3

Figure 3:
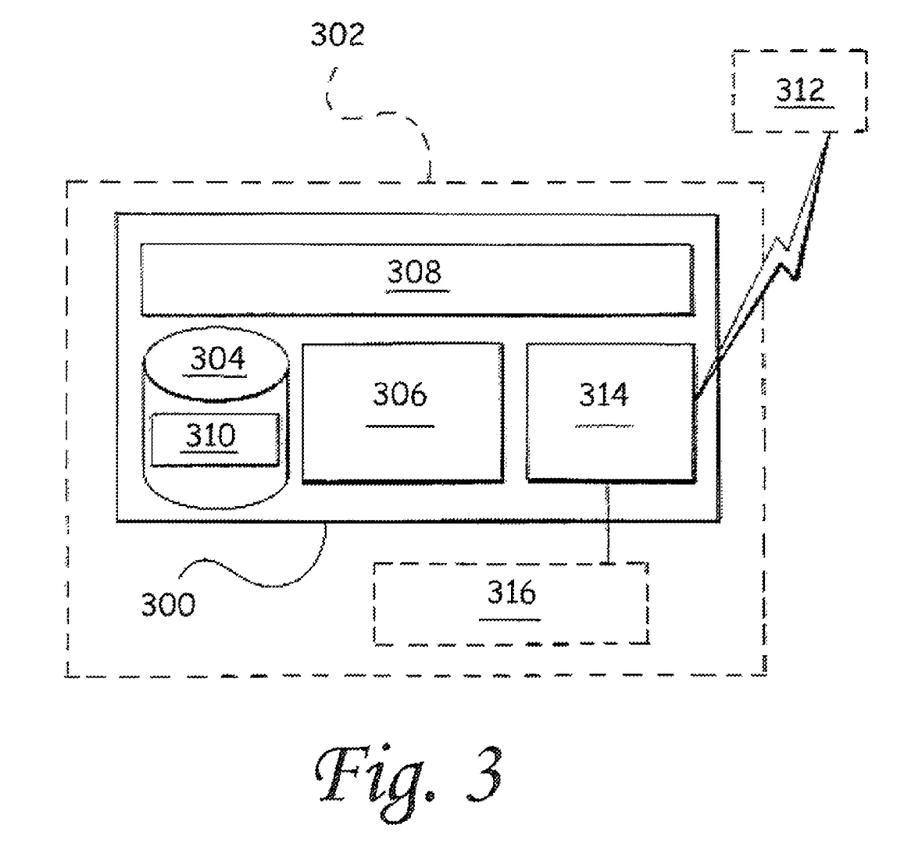
FIG. 3 illustrates an example controller for use in the present technology.

FIG. 3 illustrates schematically features of an example controller, such as computing device. The controller is indicated in FIG. 3 by reference numeral 300, and corresponds to the controller 204 referenced above in connection with FIG. 2.

As provided, the controller 300 can control or be part of an actuator, automated machinery—e.g., robotics, or other acting mechanism 302 (e.g., actuator 202).

As shown, the controller 300 includes a memory, or computer-readable medium 304, such as volatile medium, non-volatile medium, removable medium, and non-removable medium. The term computer-readable media and variants thereof, as used in the specification and claims, refer to tangible, non-transitory, storage media.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The controller 300 also includes a computer processor 306 connected or connectable to the computer-readable medium 304 by way of a communication link 308, such as a computer bus.

The computer-readable medium 304 includes computer-readable data 310, comprising computer-executable instructions or code. The computer-executable instructions are executable by the processor 306 to cause the processor, and thus the controller 300, to perform any combination of the functions described in the present disclosure.

The data 310 includes supporting information used by the processor executing the instructions to perform the functions.

In one embodiment, the data 310 includes data defining target movement-versus-time values—e.g., target displacement-versus-time values or target position-versus-time values.

The functions and supporting data 310 are described, in part, above in connection with FIG. 2, and further below, including in connection with FIGS. 4 and 5.

In a contemplated embodiment, the controller 300 is in communication with one or more remote devices 312. For instance, a central computer or service in the manufacturing plant can communicate with the controller 300, such as to provide instructions to and/or receive feedback (e.g., operations reports) from the controller 300.

The computer processor 306 is also connected or connectable to at least one interface 314 for facilitating communications, between the controller 300 and any other local components 316, such as, for instance, sensor devices like the force sensors referenced above.

The interface 314 can also be configured to facilitated communications with any remote device 312.

For communicating with the local components 316, the interface 314 can include one or both of wired connections and wireless components—e.g., transceiver, transmitter, and/or receiver.

For communicating with the remote components 312, the interface 314 includes one or both of a short-range transceiver (or transmitter and/or receiver) and a long-range transceiver (or transmitter and/or receiver).

The remote components 312 can include databases, servers, other processors, other storage mediums, and/or other computing devices, such as other systems in a manufacturing plant communicating instructions to and/or receiving data from (e.g., performance reports) the controller 300.

Although shown as being a part of the controller 300, completely, the interface 314, or any aspect(s) thereof, can be partially or completely a part of the controller 300. The interface 314, or any aspect(s) thereof, can be partially or completely external to and connected or connectable to the controller 300.

III. Algorithm and Method of Operation—FIG. 4

Turning to the fourth figure, FIG. 4 shows an exemplary method by way of a flow chart 400 defining a method for effective welding using a closed-loop process to match horn kinematic characteristic (e.g., position or displacement) to target motion values. Algorithms are represented by any selection of the operations illustrated and described in connection with FIG. 4.

The result is accurate and efficient welding, and more consistent robust welds compared with conventional techniques.

While joining two workpieces is described primarily herein, the number is presented as an example, and more than two pieces may be joined according to the teachings of the present disclosure.

It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended example claims. And it should also be understood that the illustrated method 400 can be ended at any time.

In certain embodiments, some or all steps of this process, and/or substantially equivalent steps are performed by, or at least initiated by a computing device, such as a processor executing computer-executable instructions stored or included at a computer-readable medium. And any one or more steps of the process can be performed, initiated, or otherwise facilitated by automated machinery, such as robotics.

The method 400 begins 401 and flow proceeds to block 402, whereat the welding energy applicator 209—e.g., ultrasonic sonotrode or horn—and the workpieces $101^1$, $101^2$ are positioned adjacent each other.

The operation 402 may include moving the applicator 209 to the workpieces 101 and/or moving the workpieces toward the applicator.

In a contemplated embodiment, the operation 402 is performed by robotic machinery moving the applicator and/or the workpieces to be adjacent each other. The machinery would be under control of the illustrated controller 204, or another computerized controller.

In another embodiment, the operation is performed manually, such as by assembly-plant personnel moving, or causing movement of, the applicator 209 and/or the workpieces 101 to become adjacent each other.

As shown in FIG. 2, one or more energy directors 208 may be positioned between the workpieces 101. As also shown, the energy directors 208 are positioned, along the system action axis 205, for receiving the vibrations along the axis 205 from the applicator 209 for forming the weld there.

The one or more protruding energy directors 208 can be formed in compression molding one of the workpieces using recesses in a mold. Generally, the director(s) 208 extend between the workpieces 101, forming a path for welding energy transmitted to the proximate workpiece $101^1$ to propagate to the area of an interface 210 between the pieces 101, and toward the distal piece $101^2$.

In the context of ultrasonic welding, the welding energy includes high-frequency (HF) ultrasonic vibrations. While ultrasonic welding is described primarily, herein, the descriptions should not be construed to rule out other forms of welding-energy application, as other types of welding energy may be used.

At block 404, the energy applicator 209 (e.g., horn) is moved to actually contact the proximate one $101^1$ of the workpieces 101 as needed, if they are not already touching as desired, or one or both of the parts 209, $101^1$ are otherwise moved to ensure the applicator 209 is properly positioned to commence application of welding energy from the applicator to the workpieces.

In one embodiment, the operation 404 involves the primary controllable actuator 202 (e.g., pneumatic or hydraulic transducer) moving the applicator 209. In a contemplated embodiment, the operation is performed manually, such as by assembly-plant personnel moving, or causing movement of, the applicator 209 and/or the workpieces 101. If performed manually, one or more operators can move the welder using a lift-assisting device (e.g., pneumatic balancer) due to the heavy weight of the welding system.

In another embodiment, automated machinery—e.g., robotics, performs the operation under control of the illustrated controller 204 or another computerized controller.

At block 406, application of welding energy is started. As provided, for ultrasonic welding, the operation involves applying, via the energy applicator 209, HF ultrasonic vibrations to, initially, the proximate workpiece $101^1$ of the two workpieces $101^1$, $101^2$. Portions of the process 400 in which welding energy is being applied are indicated in FIG. 4 generally by dashed line 407.

At block 408, the controller 204 provides to the primary controllable actuator 202, via communication channel 206, a command signal. The signal indicates a command kinematic characteristic, such as position or displacement, corresponding to a target movement, or position, for the energy applicator 209 to be moved, or moved to. The command signal corresponds to a time instance—e.g., immediately upon receipt of the command signal, that the movement or position should be effected.

In a first, initial, iteration of the process 400, then, the command signal is an initial command signal, or initial command communication, indicating an initial command kinematic characteristic corresponding to an initial target kinematic characteristic for the energy applicator 209 in connection with an initial time instance.

The system can be configured so that the command provides a target distance that the horn 209 should travel—e.g., displacement—or target position that the horn should be moved to. While embodiments using displacement are at times described primarily herein, corresponding embodiments in which the command indicates target positions, or other motion-related characteristics, are considered disclosed as alternatives in the same descriptions.

The initial target horn-kinematics information—e.g., displacement or position—is part of the data 310 described above. In one embodiment, the data 310 includes numerous target kinematic characteristic (e.g., position or displacement), including the initial target kinematic characteristic, corresponding to numerous respective time instances of the welding sub-process 407.

Values of the data 310 are pre-determined, such as in laboratory testing. The values are determined to be, for instance, optimal, preferred, or target kinematic characteristics (e.g., position, displacement, velocity, or acceleration values) by which the energy applicator 209 would move, during the welding sub-process, for making a preferred type (e.g., size, shape, positioning) of weld to join the workpieces $101^1$, $101^2$.

As provided, in one embodiment, it is a preferred, main-line approach to, for instance, set a target displacement (or velocity, or acceleration) profile as a function of time, or it could be as a function of cumulative power (i.e., energy) input into the process. For example, the profile can be set to produce a certain amount of displacement at a certain point in time, or certain displacements at various corresponding times of the welding process. In another embodiment, the profile could also be set to accomplish a certain amount of displacement after inputting a certain amount of energy, via the horn, into the workpiece(s) (or workpieces/weld).

As mentioned, the target kinematics-versus-time values (e.g., target displacement, position, velocity, or acceleration versus time values) may be embodied as a profile or signature, including, e.g., a target horn-displacement-values line, a target horn-position-values line, a target horn-velocity-values line, or a target horn-acceleration-values line. The data 310 may include a representation of the chart and/or data indicating data points on the target-kinematic-values line. As described further below, the profile in many implementations does not form a straight line—i.e., the target kinematic characteristic-versus-time line is not always linear.

Figure 5:
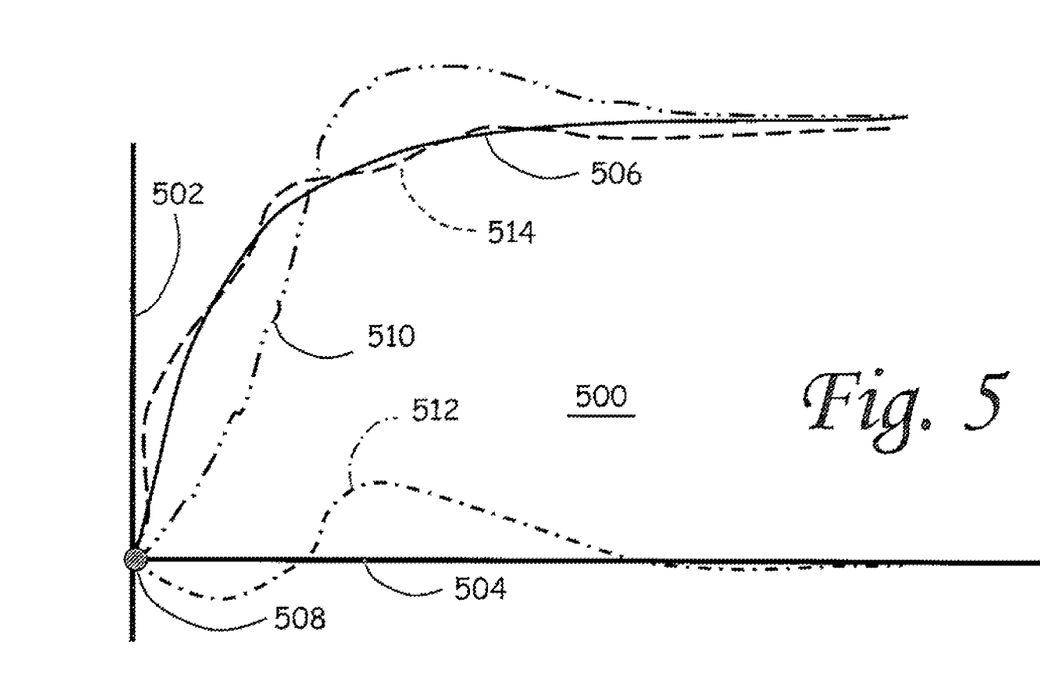
FIG. 5 illustrates an example target horn-kinematics profile or signature, showing target ultrasonic horn motion values as a function of time.

FIG. 5 shows an example chart 500 including a y-axis 502 corresponding to a kinematic characteristic for the energy applicator 209. Example kinematic characteristics include a linear special measurement, such as horn displacement, or horn position.

In some embodiments, the x-axis 504 corresponds to time during the welding routine 407 (the routine may be, e.g., about one-second long, or slightly less). As provided, in some embodiments, the kinematic profile includes pre-set kinematic targets (e.g., displacement, position, velocity, or acceleration) as a function of cumulative power (i.e., energy) input into the workpiece arrangement in the welding process. The x-axis 504 in these cases would thus represent the cumulative energy. The embodiments in which the axis 504 represents time is described primarily, herein, the embodiments in which the comparison factor is energy, instead, are considered disclosed in the same descriptions.

The chart 500 indicates the target kinematic values (e.g., displacement) by reference numeral 506.

The point 508 at which the axes 502, 504 meet represents, for the line 506, a starting point in time (e.g., time is nil, or t=0), and an initial kinematic characteristic (e.g., where displacement is nil, or d=0, or an initial position is nil, or x=0).

With continued reference to FIG. 4, and operation 408, the initial target movement, then, can be a first data point on the target-kinematics-values line 506 (e.g., target displacements, or target positions) of the chart 500, or at least a first data point in the data 310, corresponding to a first non-zero time instance—e.g., the initial time instance referenced above. The first non-zero time instance corresponds to the first time instance to the right of the starting point 508 in FIG. 5, for which a target kinematics value (i.e., the initial target displacement or position value) exists.

As an example, the first, initial, time instance can be at $1/60^{th}$ of a second after zero 508, and the corresponding first, initial, displacement value can be 0.00833 mm. As another example, the first, initial, time instance can be at $1/60^{th}$ of a second after zero 508, and the corresponding first, initial, displacement value can be 0.0833 mm. These two examples are calculated based on the scenarios mentioned above in which the workpiece can have a thickness between about 0.5 mm and about 5 mm, and the actuator can be configured to move separately every $1/60^{th}$ of a second. The two examples, then, provide displacement values being, only by way of example, $1/60^{th}$ of two of the possible workpiece thicknesses, respectively.

The horn, though, will not likely move in equal increments over time. Generally, the amount of horn displacement over a certain period of time depends on factors including an amount of vibratory energy introduced into the workpiece(s), the melting temperature of the material, the density of the material, a thickness of the workpiece(s), etc.

The examples also do not indicate that the kinematic characteristic (e.g., position or displacement) values, or the time instances at which movements are to be made, over the welding period will be evenly distributed. Supporting this premise, the target line 506 in FIG. 5 is not linear. The non-linearity results from the various movement values not all being the same and/or an amount of time between the corresponding time instances not all being the same.

Non-linearity of the kinematic characteristic (e.g., position, displacement, velocity, or acceleration) line 506 is described further below in connection with non-uniform workpiece melting.

In a contemplated embodiment, the target line 506 is linear. Such linearity can result, for instance, from the kinematic characteristic values and corresponding time instances being consistent throughout the welding period. A generally linear line can also result from movement values that are not all the same, and time instances that are not all the same, but wherein the displacement values and time instances are such at the resulting line 506 is generally straight. Or the line 506 can be straight in any stretches thereof. A fully-straight line 506 is a relatively rare occurrence in programming system according to the present technology, and is not described in further detail.

With continued reference to FIG. 4, following the commencement of welding in block 406, the workpiece receives the welding energy—e.g., the HF ultrasonic vibrations, and begins to melt. More particularly, the vibrations create frictional heat, initially at faying interfaces (i.e., tool-to-workpiece, workpiece-to-workpiece), and then intermocular friction in the composite material of the workpieces $101^1$, $101^2$, causing the workpiece material to melt. When the melting occurs at the interface 210, such as due to the vibrations transmitting to the energy directors 208, the workpieces $101^1$, $101^2$ are joined there by molecular bonds (e.g., fusion or covalent bonds) of the molten material.

As the HF vibrations begin to enter the workpieces, initially, material of the proximate workpiece $101^1$ contacting the energy applicator 209 is one of the first portions of workpiece material to melt. For implementations in which energy directors are positioned between the workpieces $101^1$, $101^2$, as described above regarding FIG. 2 and the director 208 shown therein, the energy directors may be configured (e.g., director material) and arranged (e.g., positioned between the workpieces) to begin melting first.

Melted, or molten, workpiece material transfers vibrations much less than solid workpiece material. The vibrations still need to be provided efficiently for reaching the interface 210 to melt material and joint the workpieces there, or at least for melting workpiece material otherwise sufficiently to connect the pieces there at the interface 210.

Thus, as the proximate workpiece $101^1$ melts initially, the energy applicator 209 should be moved (e.g., downward in FIG. 2) in order to maintain robust contact with the workpieces, for continuing to transfer the vibrations to the workpieces for promoting further melting thereof.

Similarly, thereafter, as the proximate workpiece $101^1$ continues to melt, the energy applicator 209 should continue to be moved in order to maintain the robust contact with the workpieces, for continuing to transfer the vibrations to the workpieces for promoting further melting.

It has been found, generally, that an amount of a displacement that the applicator 209 should be moved relates directly (e.g., is proportional) to a size of the molten workpiece material pool—e.g., a height, width, or length of the pool, or a combination—e.g., a volume of the pool.

Importantly, for various reasons, workpieces generally do not melt uniformly. One reason is that the melting occurs at various portions of the workpiece (e.g., faying and inter-piece interfaces—e.g., inter-piece interfaces at which there are one or more energy directors), as described, at different timings.

For instance, faying interface melting will generally start first, with inter-piece melting occurring later. Melting at one of the interfaces may occur faster than the other. Even in the same portion (e.g., at the faying interface, or at the inter-part interface), melting occurs at different rates at different times of the welding process. In many cases, most-rapid overall melting would occur when melting is occurring at both interfaces.

In some implementations, the workpieces have different compositions and different melting points. Whether the workpieces have the same material, timing and rates of melting within the workpiece arrangement depends in part on an amount and location of energy application the workpieces.

With further reference to FIG. 4, at block 410 the actuator 202 receives, via the communication link 206, the initial command signal sent at block 408, and acts thereupon to move the energy applicator 209, accordingly—e.g., downward according to the initial kinematic characteristic indicated by the initial command signal—e.g., to an initial position or by an initial displacement.

At diamond 412, a determination is made as to whether the energy applicator 209 was moved exactly according to the kinematic characteristic—e.g., to the position or by the displacement)—ordered by the initial command signal. In one embodiment, the operation is performed by the controller 204.

As described above, an energy applicator may travel more or less than commanded for one or more of multiple reasons. Example reasons include, variations related to the workpieces being welded together—e.g., workpiece material, workpiece size and shape, workpiece surface roughness, workpiece surface cleanliness, and workpiece positioning. And, as provided, cleanliness of the energy applicator is also sometimes a factor affecting workpiece melting rate. And again, regarding component material, one or both workpieces may contain unintended contaminants. Or workpieces can include more or less basic material than desired, such as more or less carbon-fiber than specified. The contaminants, or surplus/deficiency in make-up materials, affect workpiece reaction to welding energy. The workpieces may melt slower, or more quickly, than usual, for instance. And again, regarding workpiece size and shape, it has been found, for example, that a relatively-slight change in volume (e.g., 2%), or difference in a local thickness or contouring, can have a relatively large affect on material melting properties. And, again, regarding workpiece positioning, one or both workpieces sometimes becomes malpositioned. Even a slight malpositioning can affect welding. Less than optimal contact between the weld energy applicator (e.g., horn) and a proximate workpiece, for instance, can lower welding effectiveness significantly in conventional open-loop system. And, as a final example, surface-related characteristics—e.g., cleanliness, roughness (rougher or smoother than specified (e.g., in a specification)), and coatings (e.g., too little or too much of a coating)—also affect the efficiency with which the ultrasonic vibrations are transferred to and through the workpieces.

With reference to FIG. 5, a second line 510 shows example actual-kinematic (e.g., displacement or position) values for a trial welding performance in which the present technology is not used. A third line 512 shows the resulting error, representing a difference between the signature, target line 506 and the actual kinematics line 510. A fourth line 514 shows example actual-movement values for a trial welding performance in which the present technology is used. As can be seen, the dynamically-adapted kinematic (e.g., displacement or position) values 514 accomplished according to the present teachings match much more closely to the target, signature line 506. In some implementations, the dynamically-adapted values 514 match almost exactly to the target line 506.

With continued reference to FIG. 4, the determination of block 412 includes comparing the actual movement of the energy applicator 209, or position of the applicator 209, to a movement ordered by the initial command signal, or to a position the applicator 209 should be at if it had been moved by exactly the movement ordered.

The actual movement of the applicator 209, or actual applicator position, is determined based on system feedback. In one embodiment, the actual movement is measured online by the actuator—e.g., servo, and the controller receives a corresponding, feedback, signal, such as via communication link 206. As provided, the servo includes a potentiometer or an encoder connected directly or indirectly to the output component—e.g., linear output shaft, to measure actual movement of the output component.

If the determination 412 has a positive result—i.e., the actual kinematics characteristic (e.g., displacement or position) of the energy applicator 209 matches the target kinematics characteristic provided in the most-recent command signal, then flow of the algorithm proceeds to diamond 414, whereat it is determined whether there are any further command signals.

If there is a negative result at diamond 414—i.e., there are no further command signals, then the applicator 209 has completed its movement and flow proceeds to oval 416. At this terminal point 416, the process can end, or be repeated, such as in connection with welding together a new set of workpieces.

If the determination 412 has a negative result—i.e., the actual kinematics characteristic (e.g., displacement or position), of the energy applicator 209 does not match the target kinematics characteristic provided in the most-recent command signal, then flow of the algorithm proceeds to block 418, whereat the error between the actual and target kinematics characteristic (e.g., displacement or position) is determined, at least a primary corrective action determined, and the correction is acted upon. Without limitation, the concept of error can be visualized in connection with the third, error line 512, mentioned above.

The corrective action includes any one or more of a wide variety of functions that, when implemented, affect the welding operation in a manner to expedite or inhibit movement of the welding energy applicator 209 so that the actual applicator 209 kinematic characteristic moves closer to the target kinematic-characteristics profile 506.

A first example corrective function includes adjusting a level of pressure between the energy applicator 209 and the proximate workpiece 101[1]. Pressure can be changed by, for instance, commanding the secondary, fine-type, actuator 204 to provide an appropriate corrective load.

The primary actuator 202 can receive the corrective command signal from the controller 204, via the same communication channel 206. If it was determined that the applicator 209 is under travelling—i.e., the workpieces are not melting as quickly as expected, and so the applicator 209 is behind the target kinematics value (e.g., displacement or position of signature 506) corresponding to the instance in time, then the corrective command instructs the actuator 202 to decrease an amount of force provided to the horn 209, thereby increasing a level of pressure between the horn 209 and workpieces 101.

If, on the other hand, it was determined that the applicator 209 is over travelling—i.e., the workpieces are melting more quickly than expected, and so the applicator 209 is ahead of the target kinematic value (e.g., has moved farther than a target displacement, or moved past a target position, indicated by the signature 506) corresponding to the instance in time, then the corrective command instructs the actuator 202 to decrease an amount of force outputted to the horn 209, and so to decrease a level of pressure between the horn 209 and proximate workpieces 101.

A second example corrective function includes adjusting the welding apparatus to provide the welding energy in a different manner, such as by increasing or decreasing a magnitude, or amplitude, of the ultrasonic vibrations being transmitted from the horn 209. By modifying the magnitude in real time, a rate at which energy is input into the workpieces/weld is modified in proportion to the magnitude change. If it was determined that the applicator 209 is under travelling—i.e., the workpieces are not melting as quickly as expected, and so the applicator 209 is behind the target movement value (e.g., of signature 506) corresponding to the instance in time, then the magnitude of vibration is increased. If, on the other hand, it was determined that the applicator 209 is over travelling—i.e., the workpieces are melting more quickly than expected, and so the applicator 209 is ahead of the target movement value (e.g., of signature 506) corresponding to the instance in time, then the magnitude of vibration is decreased.

Amplitude of vibration can be changed quite readily through changes in voltage applied to the ultrasonic transducer—e.g., increasing voltage results in increased amplitude of vibration, and vice versa.

According to a third, though unlikely, embodiment, the corrective function includes adjusting a frequency of vibrations. If the applicator 209 is under travelling, frequency is increased, and vice versa.

As referenced, more than one corrective function may be implemented at the same time. The code stored in the memory 304 of the controller 204 cause the controller to, in one embodiment, to determine a preferred ratio by which each of multiple (two or more) functions are implemented in a present iteration. In a first example, the controller may determine for instance, that 100% of a correction should be addressed using a change in pressure, and so 0% of the correction is addressed by a change in vibration magnitude and frequency. In a second example, the controller may determine for instance, that 50% of a correction should be addressed using a change in pressure, and so 40% of the correction is addressed by a change in vibration magnitude, and 10% addressed by a change in frequency. These example percentages can be set to any values, based on the pre-programmed code.

In selecting percentages of the multiple corrective function options in this embodiment of step 518, the code is programmed to cause the processor to consider one or more variables. Example variables include a magnitude of the error (i.e., how far the horn 209 is from the target movement—e.g., displacement or position), how quickly the horn needs to be moved to the target kinematics—e.g., displacement or position, how much time is spent, or left, in the welding routine 407, energy considerations—e.g., energy conservation, the like, and other. The code can be programmed with, or with data corresponding to, characteristics of the various function options (e.g., changing pressure, vibration magnitude, and vibration frequency).

The code could be programmed so that, for instance, relatively larger movement—e.g., displacement or position—errors are addressed using mostly, if not exclusively change in system pressure, considering that the changes in pressure can leaded to large changes in the pace of welding.

Conversely, the code would be programmed so that little, or no, change in system pressure is ordered if only a very small movement—e.g., displacement or position—error, because the course adjustment characteristic of the pressure change would likely overcompensate and lead to an error in the opposite direction (e.g., an over-travelling horn would quickly become an under-travelling horn, and likely to a large degree, or an under-travelling horn would quickly become an over-travelling horn, and likely to a large degree). The code may thus be programmed so that, for smaller errors, finer adjustment functions are implemented, such as change in vibration magnitude and/or frequency.

Concluding the operation of block 418, the determined corrective action(s) (one or more of, e.g., increased or decreased system pressure, vibration magnitude, and vibration frequency) is performed.

From block 418, at block 420, a next control, or command, signal is generated. As shown in FIG. 4, flow can also proceed to block 420 in response to a positive result at diamond 414—i.e., there are additional command signals.

From block 420, flow proceeds back to block 408 for providing the next course-adjustment signal to the primary actuator 202 for moving the horn 209, accordingly. For embodiments in which the system is configured so that the primary actuator 202 provide a constant, or steady-state, pressure throughout the welding routine 407, then the signal provided in the operation 420 can be the same in each iteration (e.g., each operation 408) during the welding routine 407.

Alternatively, the system can be configured so that the same course-control signal need not be provided to the primary actuator in each iteration of the welding routine 407, such as by the primary actuator 202 being configured (e.g., programmed) to perform as desired, in the same manner (by providing a constant load or a pre-defined varying load), automatically during each welding routine 407.

Accordingly, if, at any times, actual horn displacement, or position, deviates from the target displacement, or position, values (e.g., the values of target line 506), the present closed-loop, feedback, arrangement operates to cause real-time, dynamic correction.

While the present method 400 is described primarily in connection with applicator 209 kinematic profiles—e.g., a displacement or a position signature—as a standard for adaptive, dynamic, system control, the technology can be implemented instead, or in addition, with consideration given to other target profiles. Other example target profiles include a pressure profile defining target values for pressure—e.g., pressure provided by the horn on the workpieces, or pressure between the horn 209 and the under support 102. Another example target profile is a power profile defining target values of power used by, or expended by, the primary actuator during the welding.

The workpieces $101^1$, $101^2$ can include any of various materials, and have any of a variety of shapes and sizes, without departing from the scope of the present technology. In one example, the proximate workpiece $101^1$ has a thickness (top to bottom thickness in the figures) of between about 0.5 mm and about 5 mm.

The materials that the workpieces can include are mentioned above, and now in further detail. The workpieces being welded together can be similar or dissimilar.

Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymer composite) to another polymer, or to join a polymer to a metal, for instance.

In one embodiment, the material includes polyethylene. In one embodiment, the material includes polyethylene terephthalate (PET), high density polyethylene (HDPE) and/or ethylene vinyl alcohol (EVOH).

In one embodiment, at least one of the workpieces being joined includes a polymer. At least one of the workpieces can include synthetic, or inorganic, molecules. While use of so-called biopolymers (or, green polymers) is increasing, petroleum based polymers are still much more common.

Material of one or both workpieces may also include recycled material, such as a polybutylene terephthalate (PBT) polymer, which is about eighty-five percent post-consumer polyethylene terephthalate (PET).

In one embodiment one or both of the workpieces includes some sort of plastic. In one embodiment, the material includes a thermo-plastic. The pieces can include hard and/or soft plastics, such as semi-crystalline plastics.

In one embodiment one or both of the workpieces includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material in some implementations includes a polyamide-grade polymer, which can be referred to generally as a polyamide.

Material of one or both workpieces may also include includes polyvinyl chloride (PVC).

In one embodiment, the material includes acrylonitrile-butadiene-styrene (ABS).

In one embodiment, the material includes a polycarbonate (PC).

Material of one or both workpieces may also comprise a type of resin. Example resins include a fiberglass polypropylene (PP) resin, a PC/PBT resin, and a PC/ABS resin.

The workpieces may be pre-processed, such as heated and compression molded prior to the welding.

IV. Various Features of the Technology

Some but not all benefits, advantages, motivations, and results from using the present technology are described above, and some but not all summarized in this section.

The dynamic and adaptive techniques taught herein result in consistent, high-quality, ultrasonic welds connecting two polymeric-composite workpieces, or a polymeric composite workpiece to another type of workpiece.

The techniques also results in energy and time savings.

Energy is saved by, for example, avoidance of over-welding conditions.

Time is also saved by avoiding scenarios in which longer application of energy to the part is needed.

Material, energy, and possibly labor costs are saved as welds created according to the present technology do not need to be repaired, and the joined parts need not be recycled or scrapped. Corresponding system or tool downtimes are also avoided.

Cost savings follow each of the above-referenced beneficial conditions.

The present technology also creates parts having, along with strong welds, desired cosmetic quality.

By providing an efficient and effective way of joining similar-material workpieces (e.g., polymeric composite/polymeric composite) or dissimilar-material workpieces (e.g., polymeric composite/metal), for use in products such as automobiles.

Resulting benefits, including the ability to produce relatively-light products having other improved qualities including comparable or greater strength characteristics and improved corrosion resistance.

V. Conclusion

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. An ultrasonic welding system, for welding together two workpieces, comprising:
    an energy applicator positioned along a system action axis so that, in operation, ultrasonic vibrations transmitted from the energy applicator during a welding routine are transmitted to the workpieces generally at and/or adjacent the system action axis;
    a primary, course-control, actuator positioned along the system action axis so that a first, course-type, load output by the primary, course-control, actuator acts along the system action axis;
    a secondary, fine-control, actuator positioned along the system action axis so that a second, fine-type, load output by the secondary, fine-control, actuator acts along the system action axis; and
    a controller:
        in operative communication with the primary, course-control, actuator and with the secondary, fine-control, actuator;
        comprising data including an energy-applicator kinematic profile having target kinematic data points in association with time or output energy for the welding routine; and
        configured to generate, based on the energy-applicator kinematic profile, a primary, course-type, command signal and a secondary, fine-type, command signal to control the primary, course-control, actuator and the secondary, fine-control, actuator, respectively, to effect loads on the workpieces along the system action axis during the welding routine.

2. The ultrasonic welding system of claim 1, wherein the controller includes a processor and a computer-readable memory comprising the data and computer-executable instructions.

3. The ultrasonic welding system of claim 2, wherein the instructions, when executed by the processor, cause the processor to perform operations comprising performing a first iteration of closed-loop, adaptive weld applicator control.

4. The ultrasonic welding system of claim 3, wherein the first iteration of the closed-loop, adaptive weld applicator control comprises:
    a. sending the primary, course-type, command signal to the primary, course-control, actuator to cause the primary, course-control, actuator to effect, along the system action axis, a next target energy-applicator movement characteristic, of the target kinematic data points; and
    b. receiving, from a measurement device, feedback indicating an actual movement characteristic of the energy applicator.

5. The ultrasonic welding system of claim 4, wherein the first iteration of the closed-loop, adaptive weld applicator control further comprises:
    c. determining, based on the feedback during the welding routine, an error between the actual movement characteristic of the energy applicator and a corresponding target energy-applicator movement.

6. The ultrasonic welding system of claim 5, wherein the first iteration of the closed-loop, adaptive weld applicator control further comprises:

d. generating, based on the error, a secondary, fine-type, command configured to cause the secondary, fine-control, actuator to actuate, along the system action axis to correct energy-applicator movement toward minimizing the error.

7. The ultrasonic welding system of claim 6, wherein the first iteration of the closed-loop, adaptive weld applicator control further comprises:
e. sending the secondary, fine-type, command to the secondary, fine-control, actuator for execution by the secondary, fine-control, actuator to correct energy-applicator movement by providing fine-level load adjustment along the system action axis toward minimizing the error.

8. The ultrasonic welding system of claim 7, wherein the operations further comprise repeating, the operations a.-e., in connection with next iterations during the welding routine in order to maintain energy-applicator movement as close as possible to the energy-applicator kinematic profile during the welding routine.

9. The ultrasonic welding system of claim 1, further comprising an amplifier positioned between the secondary, fine-control, actuator and the energy applicator, for amplifying output load of the secondary, fine-control, actuator.

10. The ultrasonic welding system of claim 1, wherein the primary, course-control, actuator includes an actuator selected from a group consisting of:
a pneumatic actuator; and
a hydraulic actuator.

11. The ultrasonic welding system of claim 1, wherein the secondary, fine-control, actuator includes a servo motor.

12. The ultrasonic welding system of claim 11, wherein the servo motor includes, or is connected to, a measurement device.

13. The ultrasonic welding system of claim 12, wherein the measurement device includes an encoder or a potentiometer.

14. The ultrasonic welding system of claim 12, wherein the measurement device includes a linear variable differential transformer.

15. The ultrasonic welding system of claim 5, wherein:
the next target energy-applicator movement is a next target energy-applicator position;
the actual movement characteristic of the energy applicator is an actual position of the energy applicator; and
the corresponding target energy-applicator movement is a corresponding target energy-applicator position.

16. The ultrasonic welding system of claim 5, wherein:
the next target energy-applicator movement is a next target energy-applicator movement;
the actual movement characteristic of the energy applicator is an actual displacement of the energy applicator; and
the corresponding target energy-applicator movement is a corresponding target energy-applicator displacement.

17. The ultrasonic welding system of claim 1, wherein each movement characteristic includes velocity of the energy applicator or acceleration of the energy applicator.

18. The ultrasonic welding system of claim 1, wherein a first material of a first workpiece of the workpieces and a second material of a second workpiece of the workpieces are dissimilar.

19. An ultrasonic welding system, for welding together two workpieces, comprising:
a primary, course-control, actuator positioned along a system action axis so that a first, course-type, load, output by the primary, course-control, actuator, acts along the system action axis;
a secondary, fine-control, actuator positioned along the system action axis so that a second, fine-type, load, output by the secondary, fine-control, actuator, acts along the system action axis; and
a controller:
comprising data including an energy-applicator kinematic profile comprising target kinematic data points in association with time or output energy of a welding routine;
configured to generate, based on the energy-applicator kinematic profile, a primary, course-type command signal and a secondary, fine-type command signal to control the primary, course-control, actuator and the secondary, fine-control, actuator, respectively; and
configured to perform operations comprising performing a first iteration of closed-loop, adaptive weld applicator control comprising (a) sending the primary, course-type, command signal to the primary, course-control, actuator to cause the primary, course-control, actuator to effect, along a system action axis, a next target energy-applicator movement characteristic, of the target kinematic data points, (b) receiving, from a measurement device, feedback indicating an actual movement characteristic of an energy applicator, (c) determining, based on the feedback during the welding routine, an error between the actual movement characteristic of the energy applicator and a corresponding target energy-applicator movement (d) generating, based on the error, a secondary, fine-type, command configured to cause the secondary, fine-control, actuator to actuate, along the system action axis, to correct energy-applicator movement toward minimizing the error, and (e) sending the secondary, fine-type, command to the secondary, fine-control, actuator for execution by the secondary, fine-control, actuator to correct energy-applicator movement by providing fine-level load adjustment, along the system action axis, toward minimizing the error.

20. The ultrasonic welding system of claim 19, wherein the operations further comprise repeating, the operations (a)-(e) in connection with next iterations during the welding routine in order to maintain energy-applicator movement as close as possible to energy-applicator kinematic profile during the welding routine.

* * * * *